United States Patent
Kilchyk et al.

(10) Patent No.: US 11,845,562 B1
(45) Date of Patent: Dec. 19, 2023

(54) AUXILIARY POWER GENERATION AND COOLING SYSTEMS ON LIQUID HYDROGEN FUELED AIRCRAFT

(71) Applicant: Hamilton Sundstrand Corporation, Charlotte, NC (US)

(72) Inventors: Viktor Kilchyk, Lancaster, NY (US); Debabrata Pal, Hoffman Estates, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/819,706

(22) Filed: Aug. 15, 2022

(51) Int. Cl.
| | |
|---|---|
| *B64D 41/00* | (2006.01) |
| *B64D 33/08* | (2006.01) |
| *B64D 37/02* | (2006.01) |
| *B64D 27/24* | (2006.01) |
| *B60L 50/70* | (2019.01) |
| *H01M 8/04089* | (2016.01) |
| *H01M 8/04186* | (2016.01) |
| *H01M 8/04746* | (2016.01) |
| *H01M 8/04082* | (2016.01) |
| *F01K 25/10* | (2006.01) |

(52) U.S. Cl.
CPC ............. *B64D 41/00* (2013.01); *B60L 50/70* (2019.02); *B64D 27/24* (2013.01); *B64D 33/08* (2013.01); *B64D 37/02* (2013.01); *F01K 25/10* (2013.01); *H01M 8/04089* (2013.01); *H01M 8/04186* (2013.01); *H01M 8/04201* (2013.01); *H01M 8/04753* (2013.01); *B60L 2200/10* (2013.01); *B64D 2041/005* (2013.01); *H01M 2250/20* (2013.01)

(58) Field of Classification Search
CPC ........ B64D 41/00; B64D 27/24; B64D 33/08; B64D 37/02; B64D 2041/005; B60L 50/70; B60L 2200/10; H01M 8/04089; H01M 8/04186; H01M 8/04201; H01M 8/04753; H01M 2250/20; F01K 25/08; F01K 25/10
See application file for complete search history.

(56) References Cited

U.S. PATENT DOCUMENTS

| | | | |
|---|---|---|---|
| 11,575,138 B1* | 2/2023 | Miftakhov | H01M 8/04014 |
| 2021/0300575 A1 | 9/2021 | Staubach et al. | |
| 2022/0297844 A1* | 9/2022 | Mackin | B64C 21/08 |
| 2022/0341546 A1* | 10/2022 | Jung | H01M 8/04425 |
| 2023/0023222 A1* | 1/2023 | Kwon | B60L 50/75 |

FOREIGN PATENT DOCUMENTS

| | | | |
|---|---|---|---|
| EP | 3048281 B1 | | 4/2017 |
| JP | S62146098 U | * | 9/1987 |
| KR | 2022099292 A | * | 7/2022 |

OTHER PUBLICATIONS

JP S62146098 U translation Date: Sep. 1987.*
KR-2022099292-A translation Date: Jul. 2022.*

* cited by examiner

*Primary Examiner* — Mickey H France
(74) *Attorney, Agent, or Firm* — CANTOR COLBURN LLP (57) ABSTRACT

A power system includes a liquid hydrogen fuel source including a fuel tank containing a volume of hydrogen fuel. The fuel tank includes two or more vacuum insulation layers, and a liquid insulation material positioned between the two or more vacuum insulation layers. A first power generator located fluidly downstream of the hydrogen fuel source. The first power generator utilizes a flow of hydrogen fuel from the volume of hydrogen fuel to generate electrical or mechanical power.

15 Claims, 7 Drawing Sheets

AUXILIARY POWER GENERATION AND COOLING SYSTEMS ON LIQUID HYDROGEN FUELED AIRCRAFT

BACKGROUND

Exemplary embodiments pertain to the art of hydrogen fueled vehicles, such as aircraft. Hydrogen fueled vehicles, such as aircraft, utilize hydrogen fuel in a fuel cell or combustion engine to provide primary power to the vehicle. The hydrogen is stored in liquid phase at about 20 degrees Kelvin, and for use in a fuel cell should be brought from the storage temperature to a temperature of 300 degrees Kelvin or higher. In such warming of the liquid hydrogen, it would be desirable to utilize excess energy already within the system and prevent waste of such energy.

BRIEF DESCRIPTION

In one embodiment, a power system includes a liquid hydrogen fuel source including a fuel tank containing a volume of hydrogen fuel. The fuel tank includes two or more vacuum insulation layers, and a liquid insulation material positioned between the two or more vacuum insulation layers. A first power generator located fluidly downstream of the hydrogen fuel source. The first power generator utilizes a flow of hydrogen fuel from the volume of hydrogen fuel to generate electrical or mechanical power.

Additionally or alternatively, in this or other embodiments the liquid insulation material is a liquid fuel.

Additionally or alternatively, in this or other embodiments the liquid insulation material is one of hydrogen or methane.

Additionally or alternatively, in this or other embodiments a thermal engine is configured to expand the liquid insulation material into gaseous form via interaction between a heated first portion of the liquid insulation material and a second portion of the liquid insulation material. A heat exchanger is located between the liquid hydrogen source and the thermal engine. The heat exchanger is configured to heat the first portion of the liquid insulation material via thermal energy exchange with a relatively warm fluid. A second power generator is located fluidly downstream of the thermal engine. The second power generator utilizes exhaust from the thermal engine to generate electrical or mechanical power.

Additionally or alternatively, in this or other embodiments the second portion of the hydrogen fuel is exhausted from the thermal engine at 300 degrees Kelvin or more.

Additionally or alternatively, in this or other embodiments a turbine is located fluidly downstream of the heat exchanger and upstream of the thermal engine. The turbine is driven by the heated first portion of the liquid insulation material.

Additionally or alternatively, in this or other embodiments an electrical generator is operably connected to the turbine to generate electrical power via rotation of the turbine.

Additionally or alternatively, in this or other embodiments the relatively warm fluid is lubricant circulated from the electrical generator.

Additionally or alternatively, in this or other embodiments a pump circulates the lubricant from the electrical generator.

Additionally or alternatively, in this or other embodiments a fluid separator is located between the heat exchanger and the turbine to remove condensate from the first portion of the hydrogen fuel.

Additionally or alternatively, in this or other embodiments the first power generator is a fuel cell.

In another embodiment, a method of operating a hydrogen fueled power system includes providing a liquid hydrogen fuel source including a fuel tank containing a volume of hydrogen fuel. The fuel tank includes two or more vacuum insulation layers and a liquid insulation material positioned between the two or more vacuum insulation layers. The hydrogen fuel is flowed from the volume of hydrogen fuel to a first power generator located fluidly downstream of the hydrogen fuel source. The flow of hydrogen fuel from the volume of hydrogen fuel is utilized to generate electrical or mechanical power.

Additionally or alternatively, in this or other embodiments a first portion of liquid insulation material is flowed to a heat exchanger. The first portion of liquid insulation material is warmed via thermal energy exchange with a relatively warm fluid at the heat exchanger. The warmed first portion of liquid insulation material is directed through a thermal engine, and a second portion of liquid insulation material, cooler than the first portion, is injected into the thermal engine. Gaseous liquid insulation material is exhausted from the thermal engine via operation of the thermal engine, and the exhaust gaseous liquid insulation material is directed to a second power generator disposed fluidly downstream of the thermal engine. The second power generator utilizes the gaseous hydrogen to generate electrical or mechanical power.

Additionally or alternatively, in this or other embodiments the second portion of the hydrogen fuel is exhausted from the thermal engine at 300 degrees Kelvin or more.

Additionally or alternatively, in this or other embodiments a turbine located fluidly downstream of the heat exchanger and upstream of the thermal engine is driven via the heated first portion of the liquid insulation material.

Additionally or alternatively, in this or other embodiments electrical power is generated via an electrical generator operably connected to the turbine.

Additionally or alternatively, in this or other embodiments the relatively warm fluid is lubricant circulated from the electrical generator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
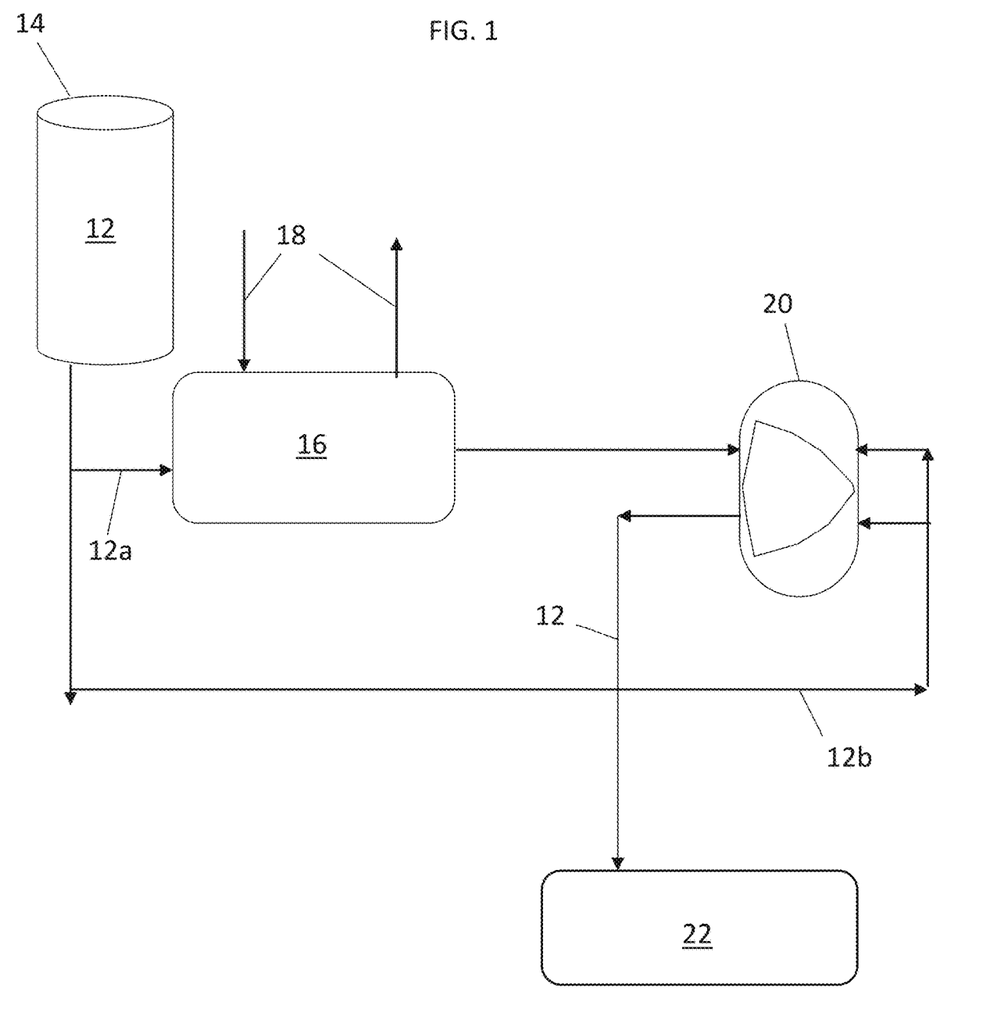
FIG. 1 is a schematic illustration of an embodiment of a hydrogen fueled power system.

Referring now to FIG. 1, illustrated is a schematic of an embodiment of a hydrogen-fueled power system 10. Hydrogen fuel 12 is stored in liquid phase in a hydrogen tank 14 at, for example, a temperature of 20 degrees Kelvin or less. The hydrogen fuel 12 flows from the hydrogen tank 14, and a first fuel portion 12a is directed through a heat exchanger 16 where it is warmed via thermal energy exchange with a heat transfer fluid 18 from a heat source. The heated first fuel portion 12a is then directed to a thermal engine 20 as gaseous hydrogen. A second fuel portion 12b, which as liquid hydrogen is much colder than the first fuel portion 12a, is injected into the thermal engine 20 from the hydrogen tank 14. The liquid hydrogen second fuel portion 12b is rapidly expanded at the thermal engine 20 and is exhausted as gaseous hydrogen fuel 12 from the thermal engine 20 at, for example, 300 degrees Kelvin or more. The gaseous hydrogen fuel 12 is then utilized for power generation at, for example, a fuel cell 22. While a fuel cell is discussed and shown in FIG. 1, one skilled in the art will readily appreciate that alternative power generation means, such as combustion, may be utilized. Further, in some embodiments and intermediate working fluid, such as gaseous hydrogen or nitrogen, may be utilized to transfer thermal energy between the first fuel portion 12a and the second fuel portion 12b.

Figure 2:
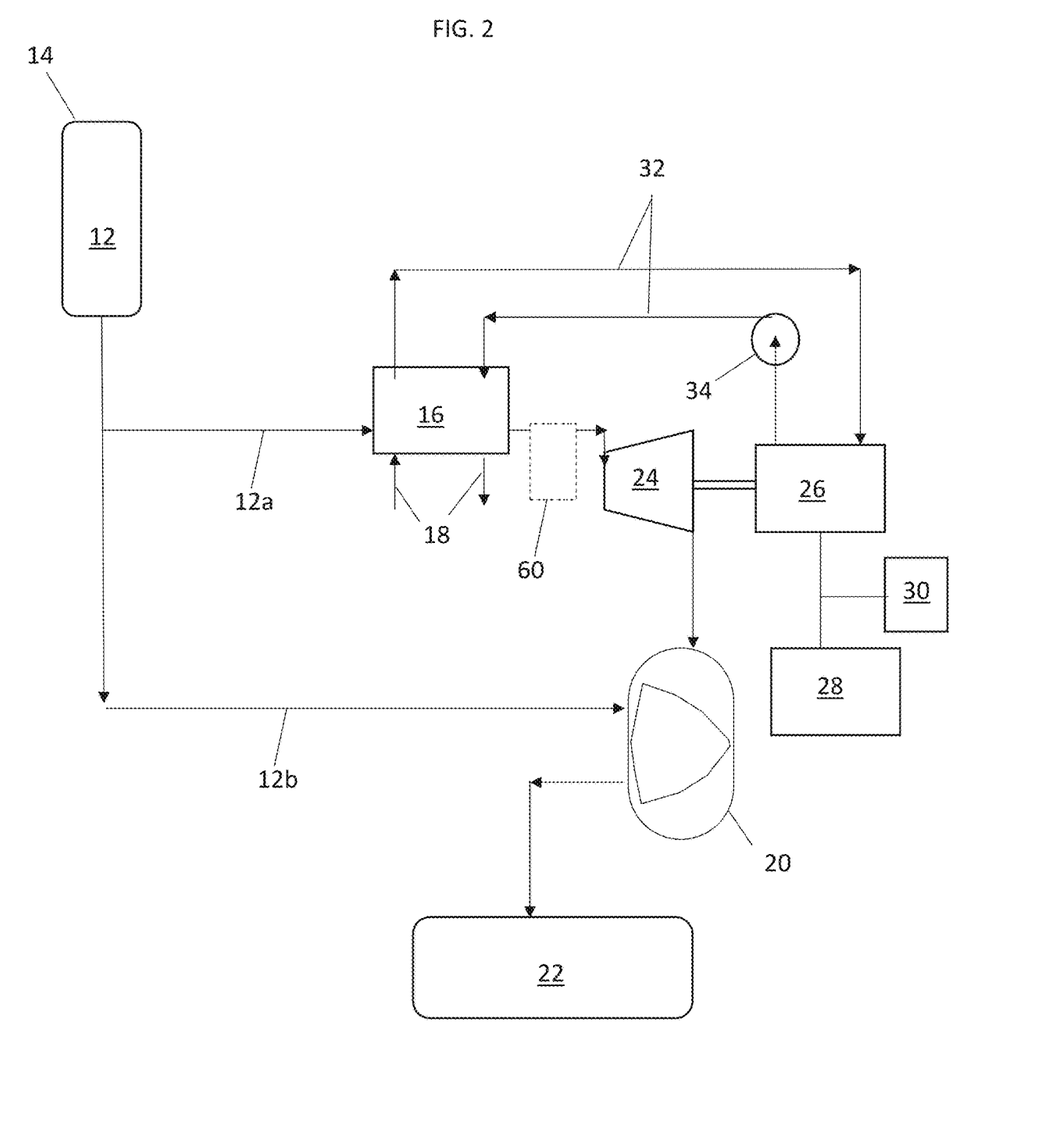
FIG. 2 is a schematic illustration of an embodiment of a hydrogen fueled power system including a turbine and generator.

Referring now to FIG. 2, the thermal energy at the heat exchanger 16 may be utilized in several ways. In the embodiment of FIG. 2, before flowing to the thermal engine 20, the heated first fuel portion 12a is flowed from the heat exchanger 16 through a turbine 24 to drive rotation of the turbine 24 and expand the heated first fuel portion 12a. From the turbine 24, the heated first fuel portion 12a is flowed to the thermal engine 20. In some embodiments, a fluid separator 60 is located between the heat exchanger 16 and the turbine 24 to remove any condensate or liquid in the first fuel portion 12a before it reaches the turbine 24.

The turbine 24 is connected to an electrical generator 26 and drives the generator 26 to generate electrical power, which may be utilized to power various components 28 connected to the generator 26 either directly or via a power storage unit such as a battery 30. The generator 26 has a volume of lubricant such as oil to lubricate the generator 26. This flow of oil 32 is directed to the heat exchanger 16 via pump 34, where the flow of oil 32 exchanges thermal energy with the first fuel portion 12a to expand the first fuel portion 12a and cool the flow of oil 32 before the flow of oil 32 is returned to the generator 26.

Figure 3:
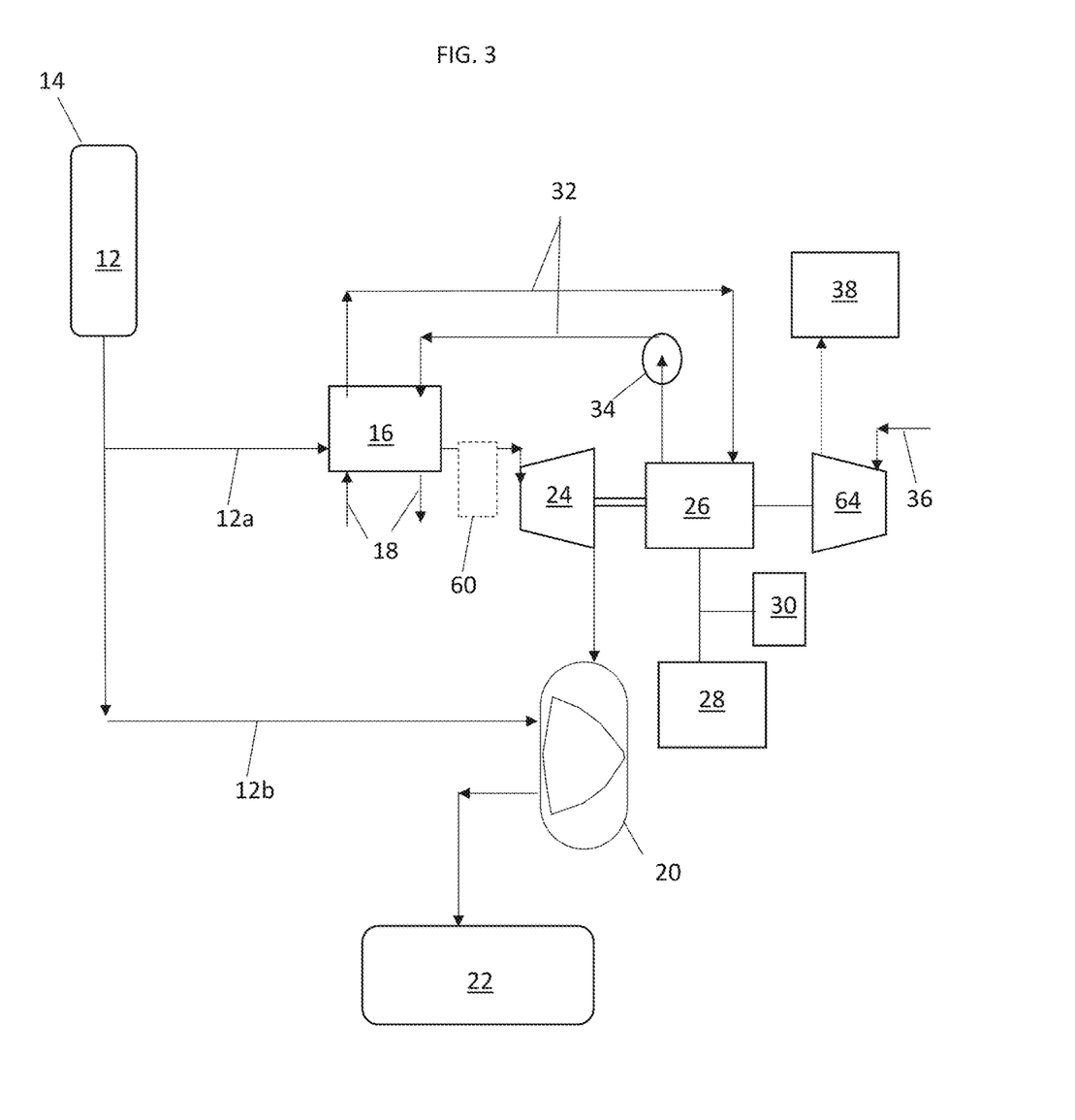
FIG. 3 is a schematic illustration of an embodiment of a hydrogen fueled power system including a compressor.
Figure 4:
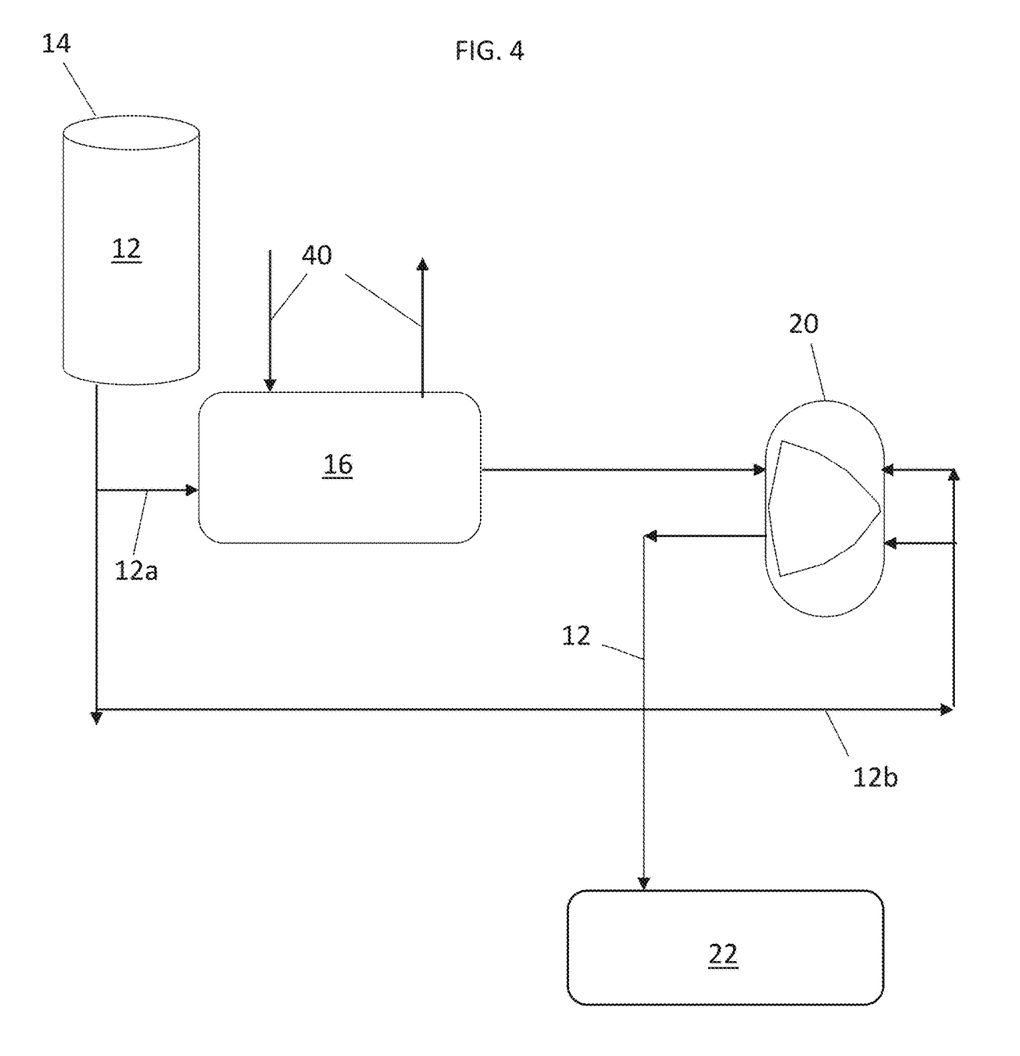
FIG. 4 is a schematic illustration of another embodiment of a hydrogen fueled power system.

In another embodiment, illustrated in FIG. 3, the system 10 includes a compressor 64 connected to the generator 26, which may also be operated as a motor to drive the compressor 64, which may be the compressor for the environmental control system (ECS) of the vehicle or aircraft. The compressor 64 compresses an airflow 36 from an air source, for example, ambient, and directs the compressed airflow 36 to the ECS 38. Referring now to FIG. 4, a cooling loop 40 using non-freezing working fluids such as Helium, Neon, or Hydrogen is connected to the heat exchanger 16 from one or more other vehicle components such as motors, electronics, oil system or the ECS 38, The cooling loop 40 provides cooling to the one or more vehicle components, and at the heat exchanger 16 exchanges thermal energy with the first fuel portion 12a to heat the first fuel portion 2a before the first fuel portion 12a is directed to the thermal engine 20.

Figure 5:
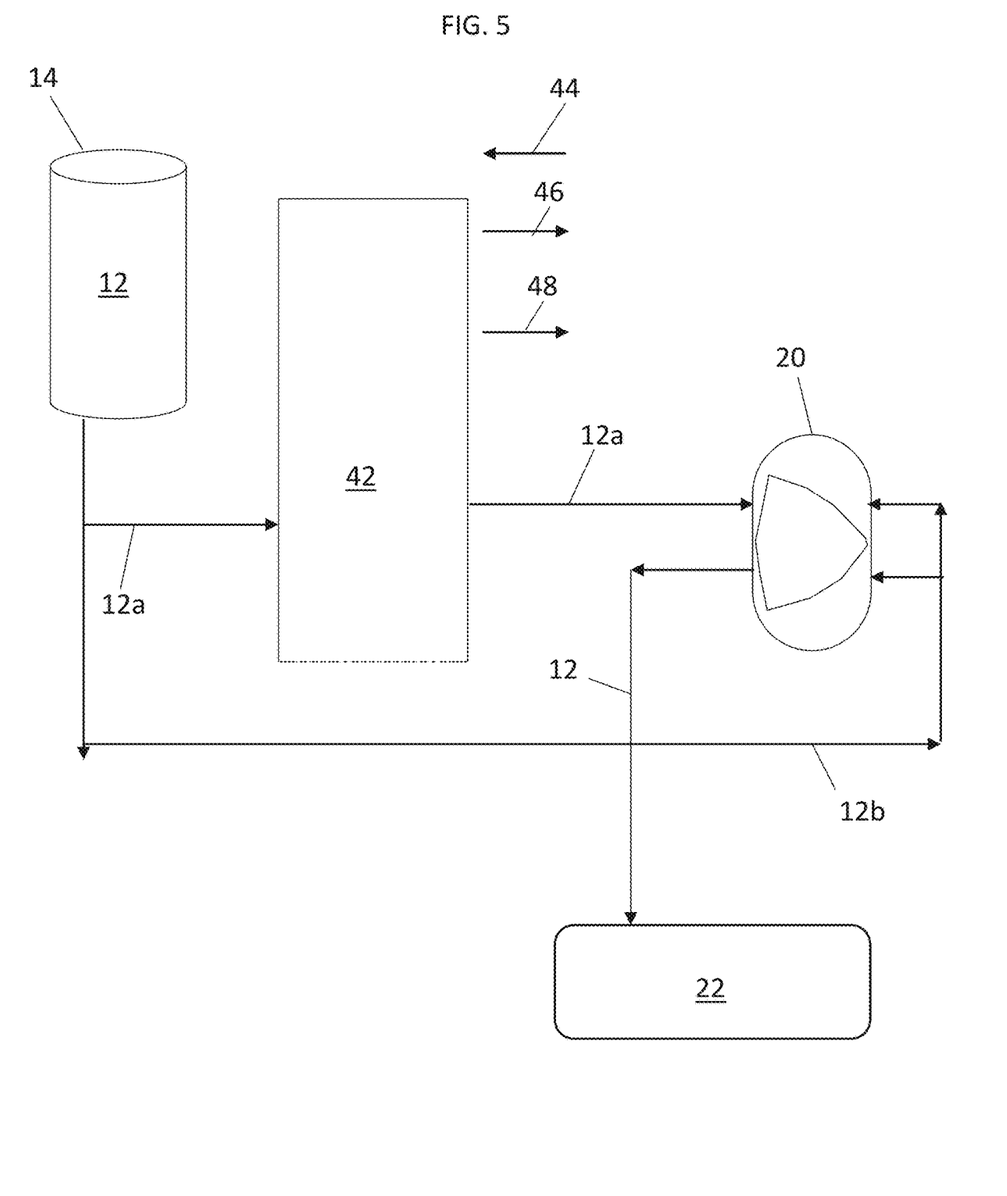
FIG. 5 is a schematic illustration of an embodiment of a hydrogen fueled power system including a distiller.

Referring now to FIG. 5, the heat exchanger 16 may be operated as a distiller 42. The distiller utilizes the first flow of fuel 12a and a flow of air 44 to provide oxygen enriched air 46 and nitrogen enriched exhaust 48 as will as the heated first fuel portion 12a. The gaseous heated first fuel portion 12a is directed to the thermal engine 20, which in systems 10 where the power generation means is combustion, the oxygen enriched air 46 is flowed to a combustor for combustion with the flow of fuel 12.

Figure 6:
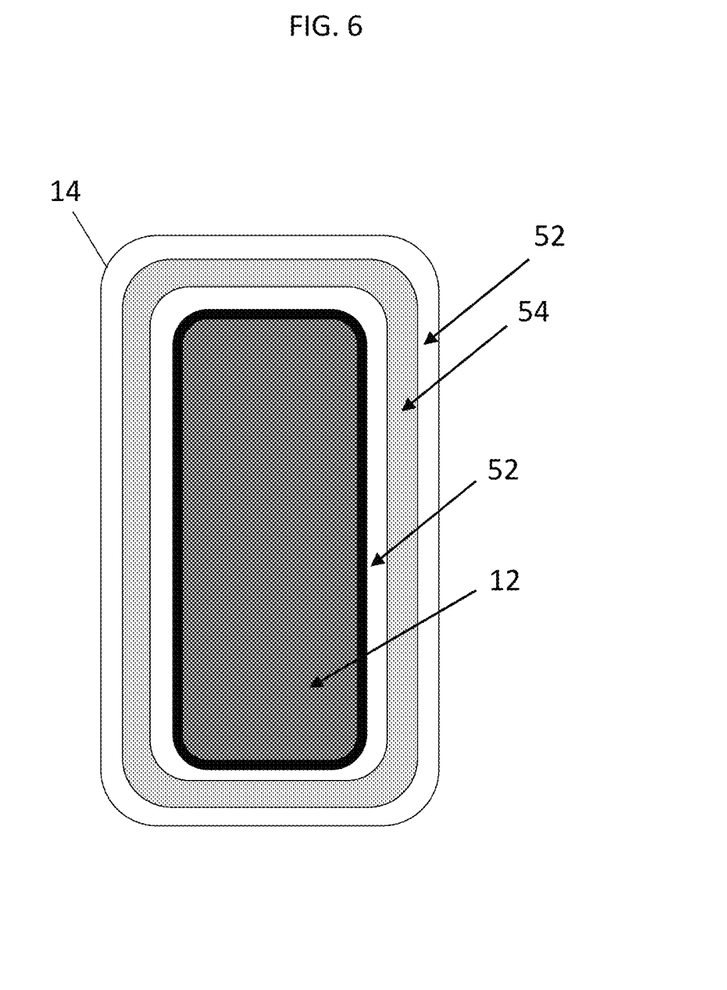
FIG. 6 is a schematic illustration of an embodiment of a liquid hydrogen storage tank.

Referring now to FIG. 6, illustrated is an embodiment of a hydrogen tank 14. The hydrogen tank 14 surrounds the hydrogen fuel 12 with one or more thermal insulating layers. In one embodiment, such as illustrated in FIG. 6, the one or more insulating layers includes two vacuum insulating layers 52, with a methane insulating layer 54 between the vacuum insulating layers 52. The methane insulating layer 54 has a boiling point of 116 degrees Kelvin, and may be utilized for combustion if needed.

Figure 7:
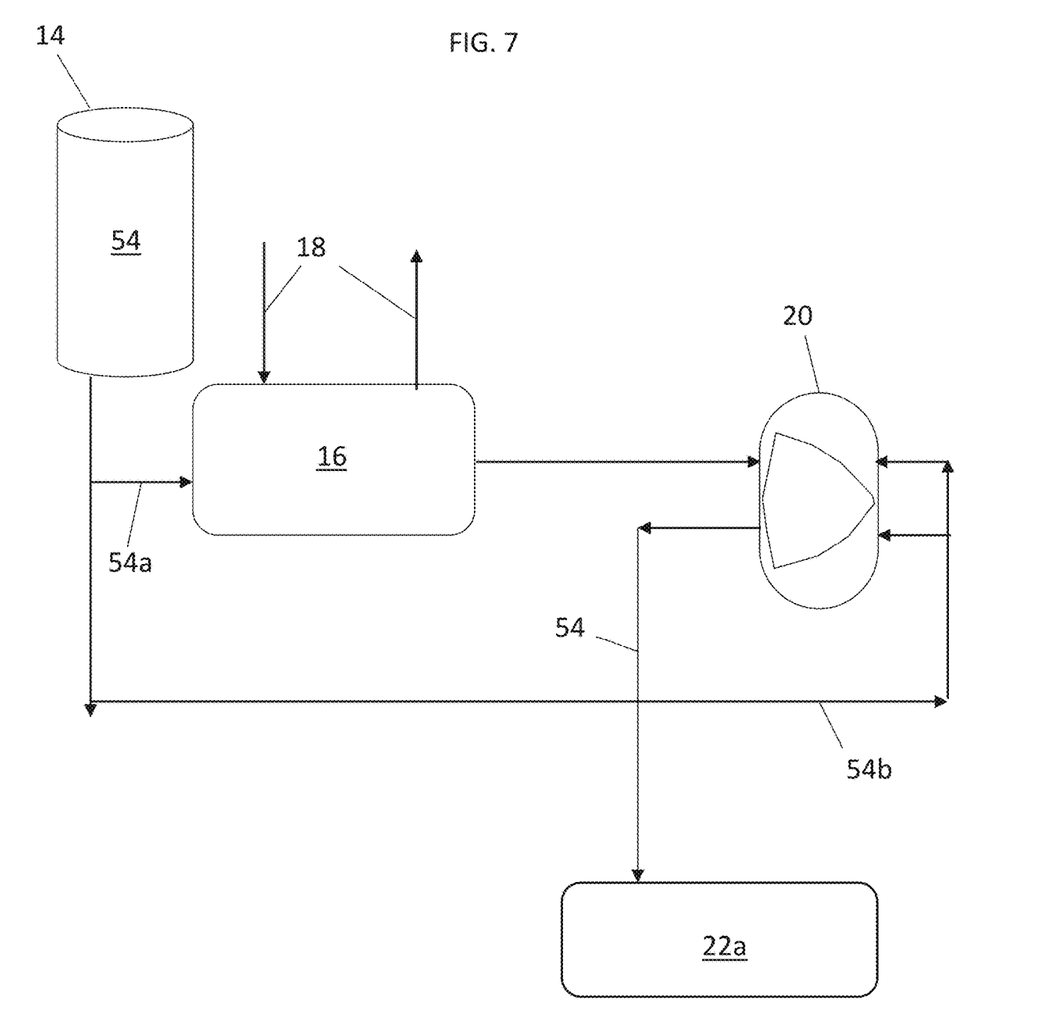
FIG. 7 is a schematic illustration of yet another embodiment of a hydrogen fueled power system.

As shown in FIG. 7, in some embodiments the insulating layer 54 is also a liquid fuel, which may be combusted with the hydrogen fuel 12 stored in the hydrogen tank. The insulating layer 54 is for example, methane or a renewable fuel having a low boiling temperature. This insulating layer 54 may be processed similar to the hydrogen fuel 12 as in FIGS. 2 and/or 3. For example, as shown in FIG. 7 a first insulating layer portion 54a through the heat exchanger 16 where it is warmed via thermal energy exchange with the heat transfer fluid 18 from a heat source. The heated first insulating layer portion 54a is then directed to a thermal engine 20 as gaseous hydrogen. A second insulting layer portion 54b, which as liquid insulating layer material is much colder than the first insulating layer portion 54a, is injected into the thermal engine 20 from the hydrogen tank 14. The liquid second insulating layer portion 54b is rapidly expanded at the thermal engine 20 and is exhausted as gaseous insulating layer material 54b from the thermal engine 20 at, for example, 300 degrees Kelvin or more. The insulating layer material 54b is then utilized for power generation at, for example, a fuel cell 22a. While a fuel cell is discussed and shown in FIG. 7, one skilled in the art will readily appreciate that alternative power generation means, such as combustion, may be utilized.

Utilization of the thermal energy of the hydrogen fuel 12 when heating the first fuel portion 12a can provide an additional onboard power supply, reducing overall power consumption and improve hydrogen-powered vehicle efficiency. The cooling capacity of the liquid hydrogen fuel provides either in cooling to either in flight ECS or Oxygen/Nitrogen enrichment of air for combustion. The use of enriched airflow for combustion may increase combustion efficiency by up to 15%.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power system, comprising:
    a liquid hydrogen fuel source including a fuel tank containing a volume of hydrogen fuel, the fuel tank including:
        two or more vacuum insulation layers; and
        a liquid insulation material interposed between the two or more vacuum insulation layers; and
    a first power generator disposed fluidly downstream of the hydrogen fuel source, the first power generator utilizing a flow of hydrogen fuel from the volume of hydrogen fuel to generate electrical or mechanical power;
    a thermal engine configured to expand the liquid insulation material into gaseous form via interaction between a heated first portion of the liquid insulation material and a second portion of the liquid insulation material;
    a heat exchanger disposed between the liquid hydrogen source and the thermal engine, the heat exchanger configured to heat the first portion of the liquid insulation material via thermal energy exchange with a relatively warm fluid; and
    a second power generator disposed fluidly downstream of the thermal engine, the second power generator utilizing exhaust from the thermal engine to generate electrical or mechanical power.

2. The power system of claim 1, wherein the liquid insulation material is a liquid fuel.

3. The power system of claim 1, wherein the liquid insulation material is one of hydrogen or methane.

4. The power system of claim 1, wherein the second portion of the hydrogen fuel is exhausted from the thermal engine at 300 degrees Kelvin or more.

5. The power system of claim 1, further comprising a turbine disposed fluidly downstream of the heat exchanger and upstream of the thermal engine, the turbine driven by the heated first portion of the liquid insulation material.

6. The power system of claim 5, further comprising an electrical generator operably connected to the turbine to generate electrical power via rotation of the turbine.

7. The power system of claim 6, wherein the relatively warm fluid is lubricant circulated from the electrical generator.

8. The power system of claim 7, further comprising a pump to circulate the lubricant from the electrical generator.

9. The power system of claim 5, further comprising a fluid separator disposed between the heat exchanger and the turbine to remove condensate from the first portion of the hydrogen fuel.

10. The power system of claim 1, wherein the first power generator is a fuel cell.

11. A method of operating a hydrogen fueled power system, comprising:
    providing a liquid hydrogen fuel source including a fuel tank containing a volume of hydrogen fuel, the fuel tank including:
        two or more vacuum insulation layers; and
        a liquid insulation material interposed between the two or more vacuum insulation layers; and
    flowing the hydrogen fuel from the volume of hydrogen fuel to a first power generator disposed fluidly downstream of the hydrogen fuel source;
    utilizing the flow of hydrogen fuel from the volume of hydrogen fuel to generate electrical or mechanical power;
    flowing a first portion of liquid insulation material to a heat exchanger;
    warming the first portion of liquid insulation material via thermal energy exchange with a relatively warm fluid at the heat exchanger;
    directing the warmed first portion of liquid insulation material through a thermal engine;
    injecting a second portion of liquid insulation material, cooler than the first portion, into the thermal engine;
    exhausting gaseous liquid insulation material from the thermal engine via operation of the thermal engine; and
    directing the exhaust gaseous liquid insulation material to a second power generator disposed fluidly downstream of the thermal engine, the second power generator utilizing the gaseous hydrogen to generate electrical or mechanical power.

12. The method of claim 11, further wherein the second portion of the hydrogen fuel is exhausted from the thermal engine at 300 degrees Kelvin or more.

13. The method of claim 11, further comprising driving a turbine disposed fluidly downstream of the heat exchanger and upstream of the thermal engine via the heated first portion of the liquid insulation material.

14. The power system of claim 13, generating electrical power via an electrical generator operably connected to the turbine.

15. The power system of claim 14, wherein the relatively warm fluid is lubricant circulated from the electrical generator.

* * * * *